US012003598B2

(12) United States Patent
Sunkara et al.

(10) Patent No.: US 12,003,598 B2
(45) Date of Patent: *Jun. 4, 2024

(54) METHOD AND SYSTEM FOR SEGMENTATION AS A SERVICE

(71) Applicant: Fanplayr, Inc., Menlo Park, CA (US)

(72) Inventors: Rajiv Sunkara, Mountain View, CA (US); Simon Yencken, Palo Alto, CA (US); Derek Adelman, Atherton, CA (US)

(73) Assignee: Fanplayr, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,587

(22) Filed: Jul. 18, 2022

(65) Prior Publication Data

US 2023/0010184 A1 Jan. 12, 2023

Related U.S. Application Data

(63) Continuation of application No. 17/195,475, filed on Mar. 8, 2021, now Pat. No. 11,394,810, which is a (Continued)

(51) Int. Cl.
*H04L 67/50* (2022.01)
*G06F 3/0482* (2013.01)
(Continued)

(52) U.S. Cl.
CPC .......... *H04L 67/535* (2022.05); *G06F 3/0482* (2013.01); *G06F 16/957* (2019.01);
(Continued)

(58) Field of Classification Search
None
See application file for complete search history.

(56) References Cited

U.S. PATENT DOCUMENTS

| 7,698,170 B1 * | 4/2010 | Darr ...................... G06Q 30/02 705/26.35 |
| 2007/0065206 A1 | 3/2007 | Silverbrook et al. |

(Continued)

FOREIGN PATENT DOCUMENTS

| CN | 102246150 A | 11/2011 |
| CN | 105453052 A | 3/2016 |

(Continued)

OTHER PUBLICATIONS

Adelman, "Fanplayr Knowledge Base, Fanplayr Segmentation FAQ v 1.4", Mar. 10, 2014, 24 pages.
(Continued)

*Primary Examiner* — Chris Parry
*Assistant Examiner* — Abderrahmen Chouat
(74) *Attorney, Agent, or Firm* — Haynes Beffel & Wolfeld LLP; Ernest J. Beffel, Jr.

(57) ABSTRACT

The technology disclosed relates to causing delivery of Segmentation as a Service™ (SegAAS) instrumentation code and segment processing code to run on a user's machine and generate data that tracks a user session on a website, receiving and processing data from the user session and invoking callback function code, configured to run on the user's machine, that performs actions specified by the website's operator, as triggered by delivery of segment codes. Also included is receiving readings from the user session, analyzing the data to track progress of the session, and generating segment codes that characterize results of the analysis in an actionable way specified by rules provided by the website operator. Further included are repeatedly causing delivery of updated lists of the segment codes based on the analyzing of the progress and timing delivery of unsolicited actions directed to retaining the visitor and extending the user session with the website.

24 Claims, 13 Drawing Sheets

Related U.S. Application Data continuation of application No. 16/020,730, filed on Jun. 27, 2018, now Pat. No. 10,958,743.

(60) Provisional application No. 62/539,460, filed on Jul. 31, 2017.

(51) Int. Cl.
| | |
|---|---|
| *G06F 16/957* | (2019.01) |
| *G06Q 30/0204* | (2023.01) |
| *G06Q 30/0251* | (2023.01) |
| *H04L 51/02* | (2022.01) |
| *H04L 67/306* | (2022.01) |

(52) U.S. Cl.
CPC ..... *G06Q 30/0204* (2013.01); *G06Q 30/0271* (2013.01); *H04L 51/02* (2013.01); *H04L 67/306* (2013.01)

(56) References Cited

U.S. PATENT DOCUMENTS

| | | | | |
|---|---|---|---|---|
| 2007/0150588 | A1* | 6/2007 | Ghadialy | G06Q 30/0251 709/224 |
| 2008/0300909 | A1* | 12/2008 | Rikhtverchik | G06Q 30/00 709/201 |
| 2009/0248494 | A1* | 10/2009 | Hueter | G06Q 30/0202 705/7.29 |
| 2009/0265460 | A1* | 10/2009 | Balasubramanian | H04L 43/00 709/224 |
| 2012/0084749 | A1 | 4/2012 | Gogh et al. | |
| 2012/0203639 | A1 | 8/2012 | Webster et al. | |
| 2012/0259891 | A1* | 10/2012 | Edoja | G06Q 30/02 707/E17.005 |
| 2013/0008087 | A1 | 1/2013 | Paavilainen et al. | |
| 2013/0080874 | A1* | 3/2013 | Coleman | G06F 16/972 715/234 |
| 2013/0085804 | A1 | 4/2013 | Leff et al. | |
| 2014/0245075 | A1 | 8/2014 | Dhoolia et al. | |
| 2014/0283069 | A1 | 9/2014 | Call et al. | |
| 2015/0254685 | A1 | 9/2015 | Newton | |
| 2016/0012144 | A1* | 1/2016 | Benjamin | G06F 16/9577 715/234 |
| 2016/0092914 | A1* | 3/2016 | Wiener | G06Q 30/0277 705/14.45 |
| 2017/0004519 | A1 | 1/2017 | Rao Gadiyar et al. | |
| 2017/0139802 | A1 | 5/2017 | Hajiyev et al. | |
| 2017/0161728 | A1 | 6/2017 | Satyanarayan et al. | |
| 2017/0300768 | A1* | 10/2017 | Perschk | G06Q 30/0253 |
| 2018/0240145 | A1* | 8/2018 | Zargham | G06Q 30/0226 |

FOREIGN PATENT DOCUMENTS

| | | | |
|---|---|---|---|
| JP | 2008040788 | A | 2/2008 |
| JP | 2013008233 | A | 1/2013 |
| JP | 2014049057 | A | 3/2014 |
| JP | 2017102754 | A | 6/2017 |

OTHER PUBLICATIONS

Adelman, "Fanplayr Knowledge Base, Fanplayr Analytics FAQ v 1.1", Mar. 10, 2014, 18 pages.
Adelman, "Fanplayr Knowledge Base, Segmentation Strategy White Paper v 1.0", Jul. 20, 2015, 29 pages.
Singh—"Fanplayr Whitepaper: The Transformation of Retailing, Empowering the Online Retailer", University of California, Santa Cruz, Jun. 1, 2017, 33 pages.
PCT/US2018/043195—International Search Report and Written Opinion dated Nov. 14, 2018, 11 pages.
PCT/US2018/043195—International Preliminary Report on Patentability dated Nov. 18, 2019, 29 pages.
PCT/US2018/043195—2nd Written Opinion of the International Examining Authority dated Jun. 27, 2019, 4 pages.
Brambilla et al, Asynchronous Web Services Communication Patterns in Business Protocols, Jan. 1, 2005, WEB Information Systems Engineering-Wise 2005 Lecture Notes In Computer Science; Lncs, Springer, Berlin, De, pp. 435-442.
Orchard et al., WS-CallBack Protocol (0.91), BEA Systems Inc. and Microsoft Corp., Feb. 26, 2003, 19 pages (retrieved from https://web.archive.org/web/20051226203700/http://dev2dev.bea.com/webservices/WS-CallBack-0_9.html).
CN 201880062101.8—First Office Action dated Sep. 20, 2020, 10 pages.
CN 201880062101.8—Response to First Office Action dated Sep. 20, 2020, as filed on Jan. 25, 2021, 13 pages.
EP18760069—First Office Action dated Feb. 1, 2021, 4 pages.
PCT/US2018/043195—Demand and Article 34 Amendment filed May 31, 2019, 22 pages.
PCT/US2018/043195—2nd Article 34 Amendment filed Aug. 27, 2019, 6 pages.
PCT/US2018/043195—3rd Article 34 Amendment filed Oct. 25, 2019, 26 pages.
CN 201880062101.8—Second Office Action dated Apr. 6, 2021, 7 pages.
CN 201880062101.8—Response to Second Office Action dated Apr. 6, 2021 filed Jun. 21, 2021, 11 pages.
EP 187600697 First Office Action, dated Feb. 1, 2021, 4 pages.
EP 187600697 Second Office Action, dated Jul. 28, 2021, 4 pages.
CN 201880062101.8—Third Office Action dated Jun. 26, 2021, 5 pages.
AU 2018309599—First Office Action, dated Oct. 29, 2021, 2 pages.
AU 2018309599—Response to First Office Action, filed Jan. 12, 2022, 67 pages.
AU 2018309599—Notice of Allowance, dated Jan. 20, 2022, 3 pages.
EP 187600697—Third Office Action, dated Feb. 7, 2022, 3 pages.
JP 2020-529092—First Office Action dated Jan. 11, 2022, 6 pages.
JP 2020-529092—Response to First Office Action dated Mar. 28, 2022, 10 pages.
EP 187600697—Response to Third Office Action, dated Jun. 17, 2022, 22 pages.
JP 2020-529092—Second Office Action dated Jun. 9, 2022, 4 pages.
JP2020-529092 Response to Second Office Action dated Aug. 9, 2022, Filed Nov. 2, 2022, 6 pages.
EP18760069.7 Intent to Grant (Rule 71(3)) dated Aug. 19, 2022, 7 pages.
JP2020-529092 Second Office Action dated Aug. 9, 2022, 7 pages.
JP2020-529092 Notice of Allowance with translation, dated Feb. 21, 2023, 5 pages.
JP 2023-044566—First Office Action with translation dated May 23, 2023, 6 pages.
JP 2023-044566—Response to First Office Action with translation filed Nov. 1, 2023, 13 pages.

* cited by examiner

```
<script>
    (function(d, w, s) {
        var f = w.fanplayr = w.fanplayr || { _i:[] };
        f._i.push({
            accountKey: '< KEY REPRESENTING THE WEBSITE >',
            data: {
                total: 0.00,
                discount: 0.00,
                discountCode: '',
                pageType: '',
                categoryId: '',
                categoryName: '',
                productId: '',
                productName: '',
                ... // other attributes specific to eCommerce sites
                cartAction: 'override'
            },
            custom_data: {
                // custom data pertaining to non-eCommerce sites.
                // e.g. 'departureData' for an airline website
            }
        });
        var js = d.createElement(s);
        var fjs = d.getElementsByTagName(s)[0];
        js.async = true;
        js.src='//d1q7pknmpq2wkm.cloudfront.net/js/my.fanplayr.com/fp_smart.js?';
        fjs.parentNode.insertBefore(js, fjs);
    }) (document, window, 'script');
</script>
```

```
<script>
var fanplayr_api = [];
fanplayr_api.push({
    "_type": "onPageView",
    "callback": function (event) {
        if (event.segments.indexOf("HVC") != -1) {
            // This invokes a chat window
            // 3rd party service (Olark.com)
            olark("api.box.show");
        }
        if (event.segments.indexOf("EWS") != -1) {
            // If the user falls into this segment,
            // display a popup requesting the user
            // to subscribe to the newsletter
            window.showEmailPopup();
        }
    }
});
</script>
```

Conversion Stage Waterfall

This table shows the various stages of the lifecycle of a visit and the drop-off between the stages.

The "% of group" column is an important metric and shows you the percentage of users in that stage compared to the previous stage. A lower number means this is a good area to focus on to help move users through your conversion pipeline.

| Conversion Stage | Users | % of group |
|---|---|---|
| Total Visits (non-bounce) | 6,725,463 | |
| Spent less than 10 seconds | 201,697 | |
| Reached a product page | 183,575 | |
| Did not reach a product page | 18,122 | |
| Spent more than 10 seconds | 6,523,766 | |
| Reached a product page | 6,342,348 | |
| Did not reach a product page | 181,418 | |
| Total visitors who reached a product page | 6,525,923 | 97.03% |
| Added to cart | 500,056 | |
| Did not add to cart | 6,025,867 | |
| Added to cart | 500,056 | 7.66% |
| Converted | 124,164 | |
| Non-converted | 375,892 | |
| Unique users who converted | 98,792 | 19.75% |
| Once | 85,330 | |
| Twice | 10,619 | |
| Thrice | 2,840 | |
| More than 3 times | 1,963 | |

METHOD AND SYSTEM FOR SEGMENTATION AS A SERVICE

PRIORITY APPLICATION

This application is a continuation of U.S. application Ser. No. 17/195,475 titled "METHOD AND SYSTEM FOR SEGMENTATION AS A SERVICE," filed 8 Mar. 2021, now U.S. Pat. No. 11,394,810, issued 19 Jul. 2022, which is a continuation of U.S. application Ser. No. 16/020,730 filed 27 Jun. 2018, now U.S. Pat. No. 10,958,743, issued 23 Mar. 2021, which claims the benefit of U.S. Provisional Application No. 62/539,460 filed Jul. 31, 2017. The priority applications are incorporated by reference for all purposes as if fully set forth herein.

BACKGROUND

The technology disclosed relates to the use of segmentation to identify, manage and target cohorts of users. In particular, it relates to identifying groups of users with similar traits and acting based on those traits—a process common to many online businesses, including news sites, social networking sites and e-commerce sites.

In the current market, large websites such as cnn.com, facebook.com, amazon.com, walmart.com, and other multi-million user destinations have built out extensive segmentation capabilities to identify and target users. News and social sites may target their users using advertisements, while e-commerce sites may target their users with messages and offers. Such systems revolve around hundreds of data points gathered for every interaction the user has with the site, take years to build out, involve large amounts of capital expenditure and need to be constantly updated & upgraded. In addition, they usually involve a large operating expenditure. While these costs may be feasible for large sites, many websites cannot justify large expenditures to target their users.

Several software solutions in the marketplace help websites with minimal to no segmentation capabilities, by offering a bundled solution of simple segmentation combined with targeting capabilities. These solutions tend to have a simplistic view of segmentation, using a few attributes from the user's current visit to the site, and force the sites to use their targeting capabilities which are also typically limited. These targeting capabilities may be in the form of widgets, banners and popups that can be customized to suit the website. Such capabilities seldom match the intent of the site's targeting requirements in terms of form and function.

Most websites either have access to engineering resources that can tweak their website to suit their needs, or they use complex hosting software to do the same. While this addresses the targeting of their users in a manner unique to the site, they lack the ability to segment the users in a meaningful way.

Websites also face a common problem of mixing the roles of a technical resource specialist who provides development skills, a design resource who provides user interface (UX) skills and a marketing resource who provides an understanding of the market and customers. In the currently available solutions in which the segmentation and targeting are rolled into a single product, these roles can get merged and thereby make it difficult for the marketing person to manage the segments and design widgets and possibly needing to build small scripts on the website.

An opportunity arises to help websites identify and segment their users, using a large variety of attributes ranging from their current interaction with the site, historic visit information, demographics, past conversions, simple to complex rules and combination of rules, and many other factors. The sites can have complete freedom in terms of ways they would like to target their users, ranging from showing widgets for email signup to changing the content of the site depending on the demographics, highlighting products, services or content depending on the time of day and other factors. A visitor experience that is more personalized, relevant and attractive can be achieved by software suites that can dynamically deliver appropriate displays, special offers and messaging to individual consumers and to specific market segments.

SUMMARY

Segmentation as a Service™ (SegAAS) enables externally developed applications that are accessible through a browser-based API, to access the disclosed segmentation capability. Using SegAAS enables a website to time the delivery of unsolicited but relevant, interesting actions so as to retain a website visitor. Timing of content delivery to retain the website visitor should be just right: not too soon and not too late. Analysis of website visitor behavior combines local instrumentation and remote analytics according to allocated roles among distributed computers. The combined analysis component gives a website operator actionable data usable to time content delivery.

The technology disclosed relates to systems and methods of supplying SegAAS from a SegAAS server, causing deliver of instrumentation code configured to run on a user's machine and generate instrument readings that track a user session during a visit to a website. Also, the systems and methods include callback function code included in the instrumentation code, configured to run on the user's machine, further configured to perform actions specified by an operator of the website, as triggered by delivery of a list of segment codes and receiving at a SegAAS server a series of the instrument readings from the user session with the website, and analyzing the instrument readings received at the server to track progress of the user sessions. From the analyzing the systems and methods include generating a list of segment codes that characterize results of the analyzing according to parameters or rules specified by an operator of the website being visited in the user session, repeatedly causing delivery of updated lists of the segment codes based on the analyzing of the progress, and the operator of the website being able to time performance of unsolicited actions directed to retaining the user and extending the user session with the website by triggering the callback function code. As used in this context website refers to mobile apps on iOS and Android platforms as well as browsers on desktop machines and mobile devices.

Particular aspects of the technology disclosed are described in the claims, specification and drawings.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 3 shows an example script for embedding code for the disclosed specialized smart and targeted publish-and-subscribe app for tracking user data that captures visitor interaction with the customer's site.

FIG. 4 shows an example script for embedding code for activating callbacks in response to segment tag notifications.

FIG. 5 displays an example segmentation ruleset and a graphical user interface for entering rules for a ruleset.

FIG. 7 shows an example conversion stage waterfall with various stages of the lifecycle of a website visit and the drop-off between the stages.

FIG. 8 shows an example segmentation tag usable with callback functions to deliver particular segment-as-a-service offers when the override checkbox is activated.

DETAILED DESCRIPTION

Figure 1:
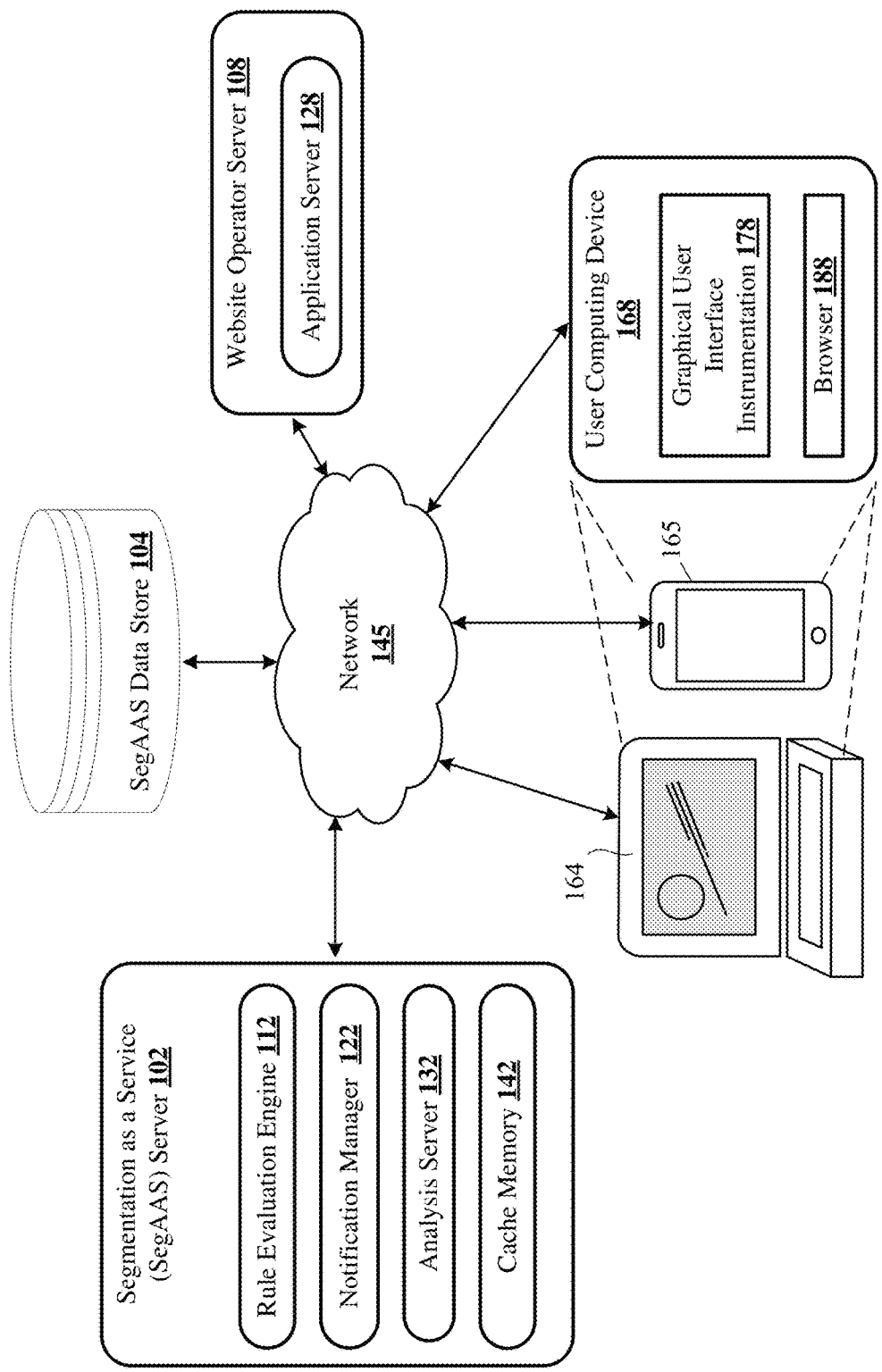
FIG. 1 shows a block diagram of an example environment for supplying Segmentation as a Service™ for timing delivery of unsolicited content directed to retaining a website visitor and extending the user session with the website.

The following detailed description is made with reference to the figures. Example implementations are described to illustrate the technology disclosed, not to limit its scope, which is defined by the claims. Those of ordinary skill in the art will recognize a variety of equivalent variations on the description that follows.

Segmentation refers to custom filtering of real-time visitor engagement data for predicting a visitor's intent while they are visiting a website. Either a digital fingerprint of the user's device configuration or personally identifiable information is used to access available historical information on the visitor. An example of user intent at a news website is to explore late breaking political news. For a business news site, a user might be looking for merger and acquisition activity or earnings surprises. For a high margin retail site, a user might be considering new fashion accessories. For a low margin retail site, a user might be buying economy razor blades. Many signals regarding history, page visits on the site, dwell time on pages and the site, saves during a visit, and the like can be combined to discern intent.

Segmentation is typically a complex, black box product. Vendors treat segmentation formulas as trade secrets and deliver messages from the results of their black box analysis.

The disclosed Segmentation as a Service™ includes a software service implementation that provides websites with the ability to segment their users in many complex ways, model complex scenarios and at the same time, give them complete flexibility and ownership of their interaction with their users and customers—without the need for large scale investment, upkeep and improvements. The service will provide websites with all services required for segmentation and, via the use of a JavaScript API, relay the information about the segments to the code on the website.

The website implements code that acts as a listener to an event emitted by the Segmentation as a Service™. When a user visits a page, or takes an action, the service evaluates all the rules of segmentation that the website has set up and notifies all the listeners, providing them with a list of segment codes for which the user has fallen into or satisfied the criteria. The website is then free to implement any targeting strategy via use of their custom code or third party software services, depending on the segments that the user has fallen into.

The disclosed Segmentation as a Service™ combines front end graphical user interface (GUI) instrumentation with backend analytics to deliver segmentation from an analysis server to an application server. For instance, a news service web page would push data from instrument code on the web page to the analysis server with an identified call back address. The analysis server would assign multiple segment codes to the visitor's session and transmit segment IDs, via the call back address on the web page, to the application server. Each time the web page visitor invoked a new page, instrument code on the news page would repeat the cycle, with the analysis server accumulating data about activity during the visitor's session. The same applies to shopping pages.

A most useful aspect of the analysis server's accumulation of data is timing. User intent is strongly indicated by their dwell time on a page and in a session—within limits, of course, such as when they walk away from the computer and leave it focused on a page. During browsing of web pages, the name of the game is stickiness. The disclosed technology helps an application server improve its stickiness using Segmentation as a Service™ to harness analytics, in real time and taking into account timing that is otherwise beyond reach of most application developers. Using Segmentation as a Service™, application servers are enabled to respond appropriately with good timing to current user intent.

Through the use of pre-installed JavaScript code called visitor tracking tags, the disclosed technology tracks and captures visitor activity as it occurs, in real-time. A visitor tracking tag is installed on each page of a website so that with each user event such as a page view, add to cart, or search. The disclosed technology includes digitizing and capturing as much of the visitor engagement as possible. This includes, but is not limited to, visitor source information, user device, and location, URL history, browsing timeline, page content, chatter sessions, cart state changes and aggregate information from prior visits. In addition, a single conversion tracking tag is installed on the confirmation page. In one use case, the confirmation page can be a thank you page that acknowledges the completion of a newsletter subscription, a completed survey or a processed order. Conversion tracking makes revenue history, average order value and conversion rate calculations possible.

The disclosed segmentation and analytics layer consumes the digitized visitor engagement data stream. It then renders it into a form in which interesting insights can be gleaned and each visitor engagement can be understood in the correct and most timely context. This layer can be custom filtered so that only the visitor events of interest are captured and acted upon for each customer.

FIG. 1 illustrates a system 100 for custom filtering of real-time visitor engagement data for predicting a visitor's intent while they are visiting a website. System 100 includes Segmentation as a Service™ server 102 with rule evaluation engine 112 for evaluating the rules set up for the website and notification manager 122 that notifies all the listeners, among distributed computers—providing them with a list of segment codes that users have fallen into or for which they have satisfied the criteria. Segmentation as a Service™ server 102 receives a series of instrument readings from the user session with the website, along with a callback API to which to deliver results. Segmentation as a Service™ server 102 also includes analysis server 132 that includes backend analytics for delivering segmentation and cache memory 142 for storing visitor engagement data, interim results of segmentation analysis and account settings. Analysis server 132 can assign multiple segment tags to the visitor's session and transmit segment IDs, via the call back address registered for the web page. Analysis server 132 accumulates data about activity during the visitor's website session and analyzes the instrument readings to track progress of the session. Analysis server 132 can accumulate data among distributed computers for many visitors to many web sites.

System 100 additionally includes Segmentation as a Service™ (SegAAS) data store 104 for storing user engagement data, rule evaluation results and analysis results. System 100 also includes website operator server 108 with application server 128 that delivers visitor websites for user interaction and receives data from the websites, utilizing an identified call back address and instrumentation code for callback registration, via network 145.

System 100 further includes user computing device 168 with graphical user interface instrumentation 178 that provides a display layer for user laptop or desktop computer 164 or mobile device 165 and utilizes instrumentation code for generating instrument readings that track a user session that visits a website. One implementation includes an extensive display toolkit with which customers can easily create a wide range of message placements in the form of interstitial banners, interactive sliders, fly outs and overlays. User computing device 168 includes a web browser 188 for displaying websites provided by application server 128, for visitors. In some implementations, browsers can include Microsoft Explorer, Google Chrome, Apple Safari, Mozilla Firefox and the like. In some implementations, user computing device 168 can be a personal computer, laptop computer, tablet computer, smartphone, personal digital assistant (PDA), digital image capture devices, and the like.

In some implementations, network(s) 145 can be any one or any combination of Local Area Network (LAN), Wide Area Network (WAN), WiFi, WiMAX, telephone network, wireless network, point-to-point network, star network, token ring network, hub network, peer-to-peer connections like Bluetooth, Near Field Communication (NFC), Z-Wave, ZigBee, or other appropriate configuration of data networks, including the Internet.

In some implementations, datastores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

Figure 2:
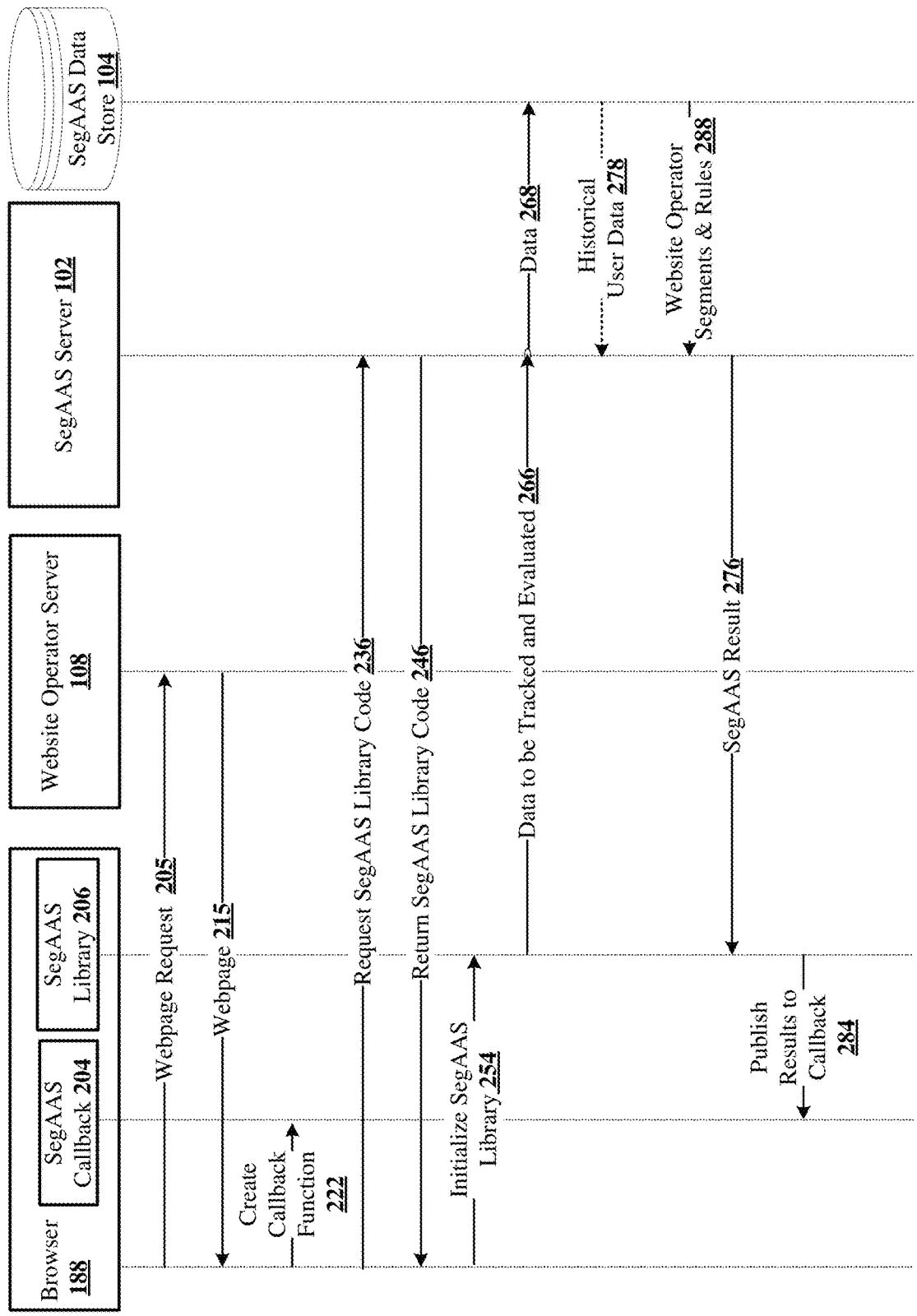
FIG. 2 shows a message diagram for a segmentation-as-a-service system.

FIG. 2 shows a message diagram for a segmentation-as-a-service system. A user requests a web page and browser 188 sends a webpage request 205 to website operator server 108. Website operator server 108 returns webpage 215, with embedded code for the specialized app for tracking user data that captures visitor interaction with the customer's site and also embedded code to set up listeners for callbacks that respond to notifications. That is, a website visitor loads the website into their browser and the website includes JavaScript that embeds the code for the disclosed specialized smart and targeted publish-and-subscribe app that tracks visitor actions on the web page and analyzes the associated ruleset for the customer website, and notifies the visitor of incentives for staying on the customer website, based on the customer's current choices and in some cases, their prior history with the customer website. In one implementation, the returned webpage 215 includes code to initially load the SegAAS library 206 and provide it with tracking data to be consumed by SegAAS server 102, including current page type, product details, and current cart details, in one implementation. Also included in the returned page is code to subscribe to any result returned by SegAAS library 206. In some implementations, the server causes delivery of the SegAAS callback function code 204 with the instrumentation code. In other implementations, the operator of the website makes SegAAS callback function code 204 available to the segment code processing code. The webpage gets executed and visualized within browser 188.

Continuing the description of FIG. 2, browser 188 configures callback functions 222 that reflect the choices specified by the website operator. In one implementation, the callback function can activate a chatbot, an email messenger service a survey service, or other desired reaction to a visitor to the website. The website operator exposes one or more callback functions that will be visible and later executed by SegAAS library 206. In one implementation of the disclosed technology, a website operator embeds code that registers a listener on each of their website pages. They can register multiple listeners, depending on the ways they want to handle events. After tracking a page view, the disclosed API notifies all the listeners with a list of the segments into which the user fell on that web page. The customer's code checks to see whether any particular segment of interest was fired. If so, the code can take an action defined by the callback functions 222. Visitors who qualify into a given segment can receive a personalized message and call-to-action. Browser 188 sends a request for SegAAS library code 236 to SegAAS Server 102, and SegAAS Server 102 returns SegAAS library code 246. Browser 188 initializes SegAAS library 254, which sends data to be tracked and evaluated 266 to SegAAS server 102 and stores data 268 in SegAAS data store 104, as historical user data 278.

Continuing further with FIG. 2, SegAAS server 102 utilizes segmentation rules, evaluates website operator segments and rules 288 with the received data, and optionally historical user data 278, and returns SegAAS results 276 to SegAAS library 206 which is running on the web page in browser 188. SegAAS library 206 publishes the results to callback 284. The visitor qualifies in a segment by satisfying all of the rules defined for that segment. If any rule in the ruleset is not met for a segment, the visitor is disqualified from qualifying for that segment with successful completion of that ruleset. In some implementations, successful completion of a specified ruleset results in a segment code being sent to an agent on the browser page of the website delivered by application server 128. Multiple listeners typically listen for result notifications from notification manager 122.

The website operator has the opportunity to run conditional logic based on the SegAAS result. In one implementation, the callback function can initiate a call to display a chat window using a third-party service or show a popup requesting the user to subscribe to a newsletter. In other implementations a third party service that protects the integrity of sensitive secure data, such as users' private personal information, can be implemented as the callback function. In yet other cases, a callback function can initiate a call to a survey software tool, or a news media distribution service or a credit calculator. A further implementation can include a call to a set of insurance-related tools for assessing risk and calculating rates. The reader can extrapolate to additional software tools that could also be instantiated by a callback function activated by the satisfaction of a different set of SegAAS rules.

FIG. 3 shows an example JavaScript script usable to embed the code for the specialized smart and targeted publish-and-subscribe app for tracking user data that captures visitor interaction with the customer's site for a document, window and script 374. URL 364 causes loading of the core internal code of the specialized smart and targeted publish-and-suscribe app w.fanplayr and associated libraries into the browser. In one example, a loaded library, when executed, takes action to display widgets specified to be activated upon successful satisfaction of a ruleset. Account key 324 is a JavaScript string that acts as a customer ID that identifies the customer website from which data is being collected and specifies the current attributes associated with the user of the webpage such as the total dollar amount in their shopping cart, any discount currently applied, product IDs and names, to Segmentation as a Service™ server 102. Segmentation tags get captured as part of the data captured via the script in FIG. 3. The script shown in FIG. 3 gets added to the customer's website to enable tracking of visitors' actions, using the disclosed technology. In one implementation, two sets of clusters of servers—one on the east coast and one on the west coast, provide speedier responses to the browser, so their data can be redirected to w1.fanplayr.com or e1.fanplayr.com, with w1 for west and e1 for east depending on the geographical location of the website visitor. The code for the specialized smart and targeted publish-and-subscribe app completes the analyzing, generating a list of segment codes that characterize results of the analysis in an actionable way specified by an operator of the website being visited in the user session. In one implementation the analyzing gets processed in the cloud.

FIG. 4 shows a script usable by a customer website developer to set up listeners for callbacks which typically respond to notifications when a visitor satisfies a specific ruleset. This example script adds code to a customer's website for Segmentation as a Service™, with two specific callback API functions that get activated conditionally based on the returned event segment value, for delivering the list of segment codes and updates to the list of segment codes based on the analyzing of the progress by the website visitor. In some implementations, the website developer could also add a third party cookie as a mechanism that allows the server to store its own information about a visitor, on the user's own computer. For one returned event segment value—high value customer (HVC) 424, a chat window for a third party service gets invoked, and for a second returned segment value email management system (EMS) 426, a popup requesting the user to subscribe to a newsletter gets activated, using the disclosed technology. The operator of the customer website can time delivery of unsolicited content directed to retaining the visitor and extending the user session with the website.

Figure 5:
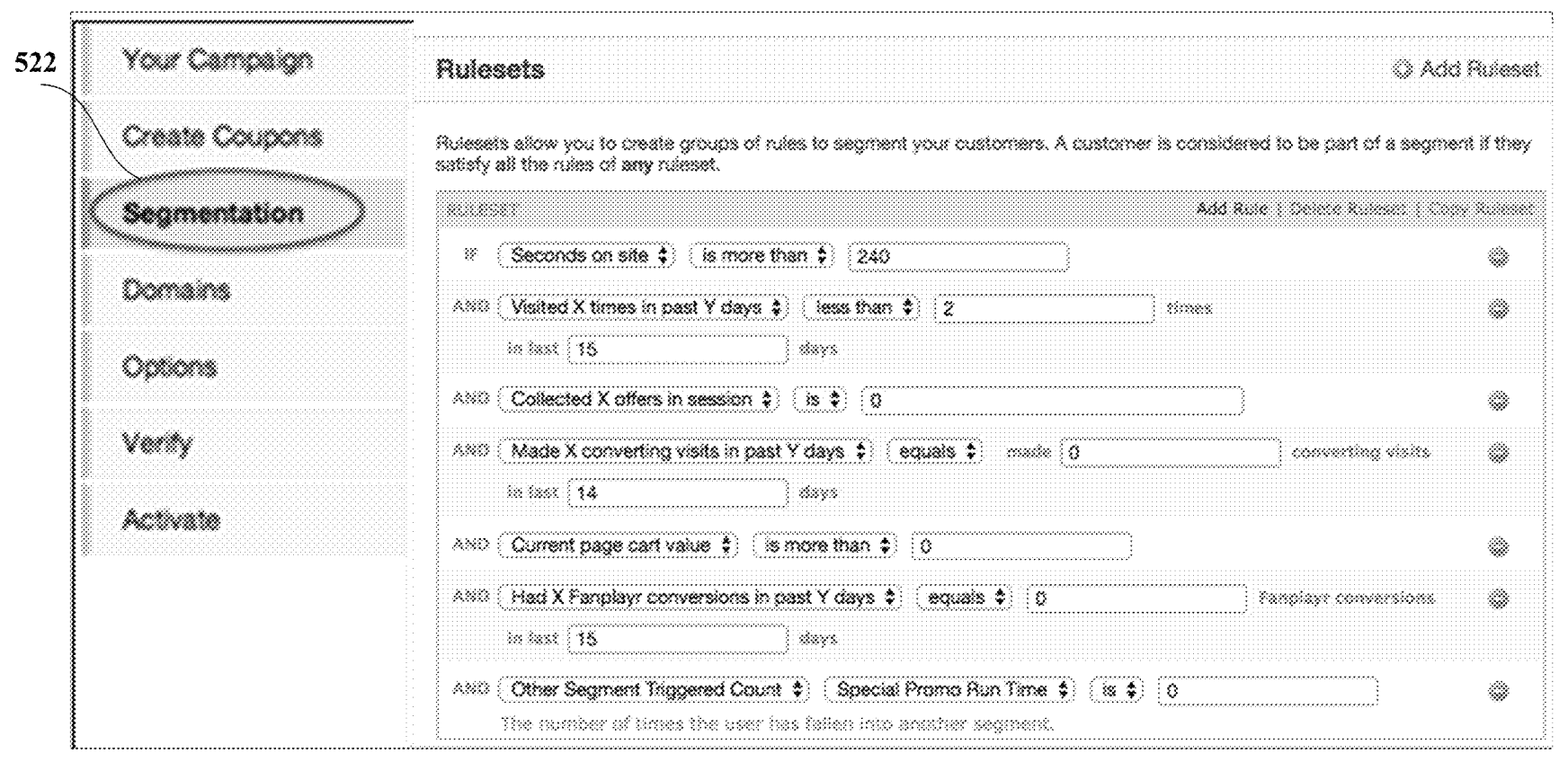

FIG. 5 shows an example display of a segmentation ruleset 522 and a graphical user interface for entering rules for a ruleset. Rulesets make it possible for external users to segment their customers. A consumer is considered to be part of a defined segment if they satisfy all the rules of any ruleset. In most implementations, rulesets are oriented to drive a short term return on investment, with segmentation rules for exit-intent handling and engagement-upsell categories. Some implementations include many rule types, in some cases as many as one hundred to one hundred fifty rules, each with multiple attributes.

SegAAS offers website operators the flexibility of doing what they need to do for their specific applications, including actions such as swapping out widgets and segmentation rules on the server, without needing to implement or otherwise replicate their own version of segmentation service. In one implementation, a creative editor tool presents customized displays on the fly, including targeted special offers, images and messaging, in ways that optimize conversion rates and increase average order value. Hence, personalized immediacy is introduced with respect to what product or service options the consumer sees, as well as to the pricing and delivery options. Example use cases for SegAAS are described next.

Use Case Examples

Chatbots—computer programs which conduct conversations via auditory or textual methods—are quickly becoming a specialization, delivering improved interpretation of visitor text or voice interactions. SegAAS is relevant to Chatbots for identifying visitors according to browsing behavior and prior visit history, in order to initiate better informed and relevant conversations earlier in the Chatbot session. Examples of relevant information include whether a user is a first-time or repeat visitor, where the visitor came from, the language a visitor is using, and whether a visitor a repeat purchaser and, if so, how much they have spent in the past. Chatbots focus on providing an informed, automated response to visitor inquiries via natural language interpretation. SegAAS can inform this service about behaviors, including visit history, current product interest and likelihood of purchase intent. This supplies greater context to each visitor engagement, thus narrowing the range of possibilities that the language interpreter must handle, enabling a faster and better-informed response.

Figure 10:
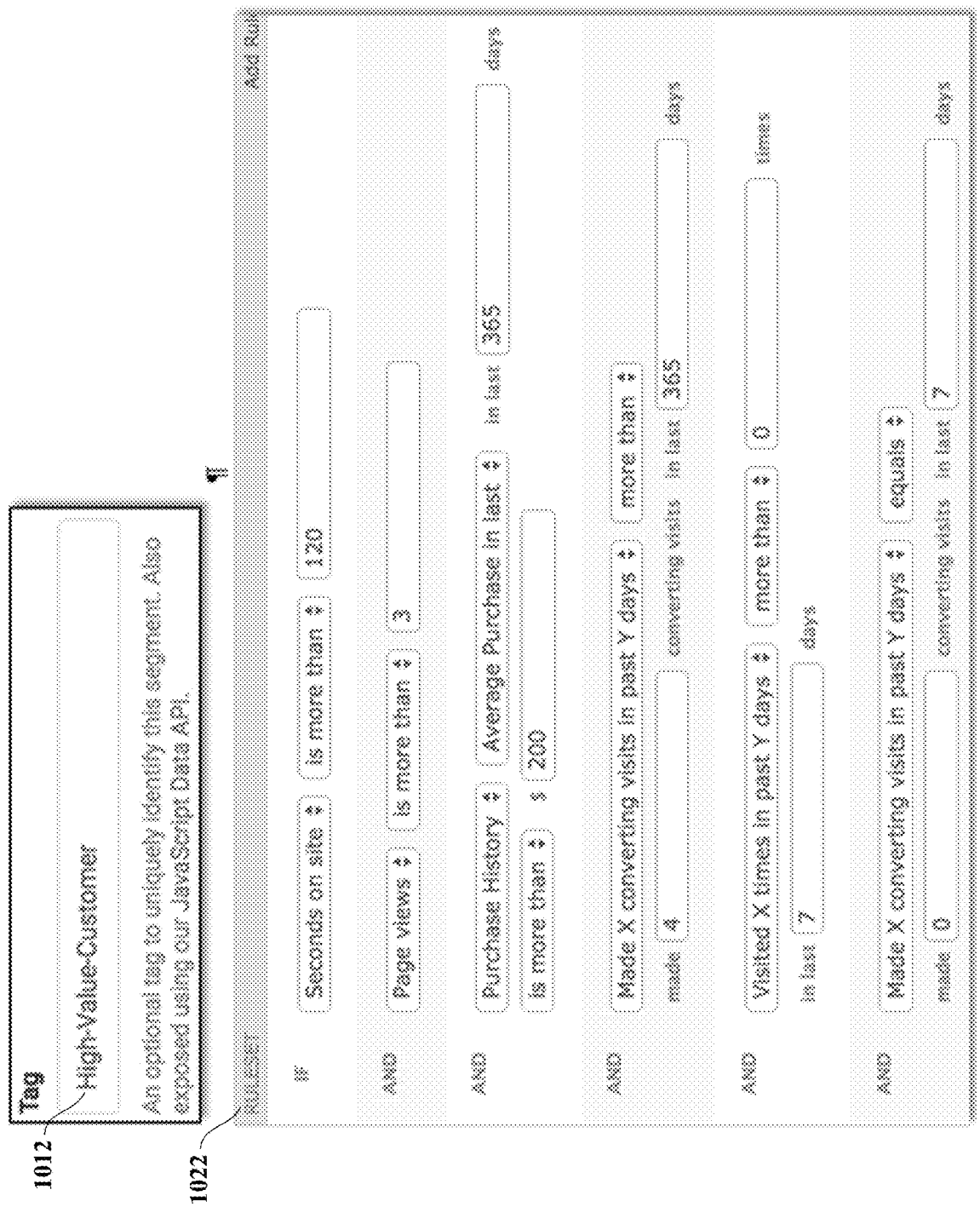
FIG. 10 shows an example ruleset 1022 and high value customer segment tag 1012 for notification to Chatbot for a high value, repeat purchaser.

FIG. 10 shows an example ruleset 1022 and high value customer segment tag 1012 for notification to Chatbot for a high value, repeat purchaser with an average purchase habit of more than $200. Specifically, the ruleset includes customers who have spent more than two minutes on the site, with more than three page views, with a purchase history with an average purchase of more than $200 in the past year, who made more than four converting visits in the past year, and who visited the site within the past seven days.

Continuing with the Chatbot use case, instrumentation code that includes a script that when executed, listens for the rule segments into which the user falls is listed next. After a user 'arrives' on a page, the content needed to immediately render the page is downloaded by the browser, processed and the page is rendered. The Fanplayr API causes the gathering of information on the page, sends it to the server, receives a response and then triggers the 'onPageView' event once the page has fully loaded. The callback function is configured to run on the user's machine to perform actions specified by an operator of the website, as triggered by delivery of a list of segment codes. In the example listed, a high value customer who meets the ruleset described supra will receive a chatbot window invoked by the sample code on the website being viewed, triggered by delivery of the high value customer segment tag 1012.

```
<script>
  var fanplayr_api = [ ];
  fanplayr_api.push({
    "_type": "onPageView",
    "callback": function (event) {
      if (event.segments.indexOf('High-Value-Customer') !== -1) {
        // Sample code to invoke a third party chat window
        olark.identify('1234-456-78-9810');
        olark('api.box.show');
      }
    }
  });
</script>
```

In one implementation, the SegAAS server causes delivery of callback function code with the instrumentation code configured to run on the user's machine. In another implementation, the website operator makes callback function code available to segment tag processing code.

Like Chatbots, surveys are also quickly becoming a specialization, delivering improved user experiences and response analysis. SegAAS is relevant to surveys by identifying visitors according to browsing behavior and prior visit history, in order to initiate better informed survey selection that is relevant to current or previous engagement.

Figure 11:
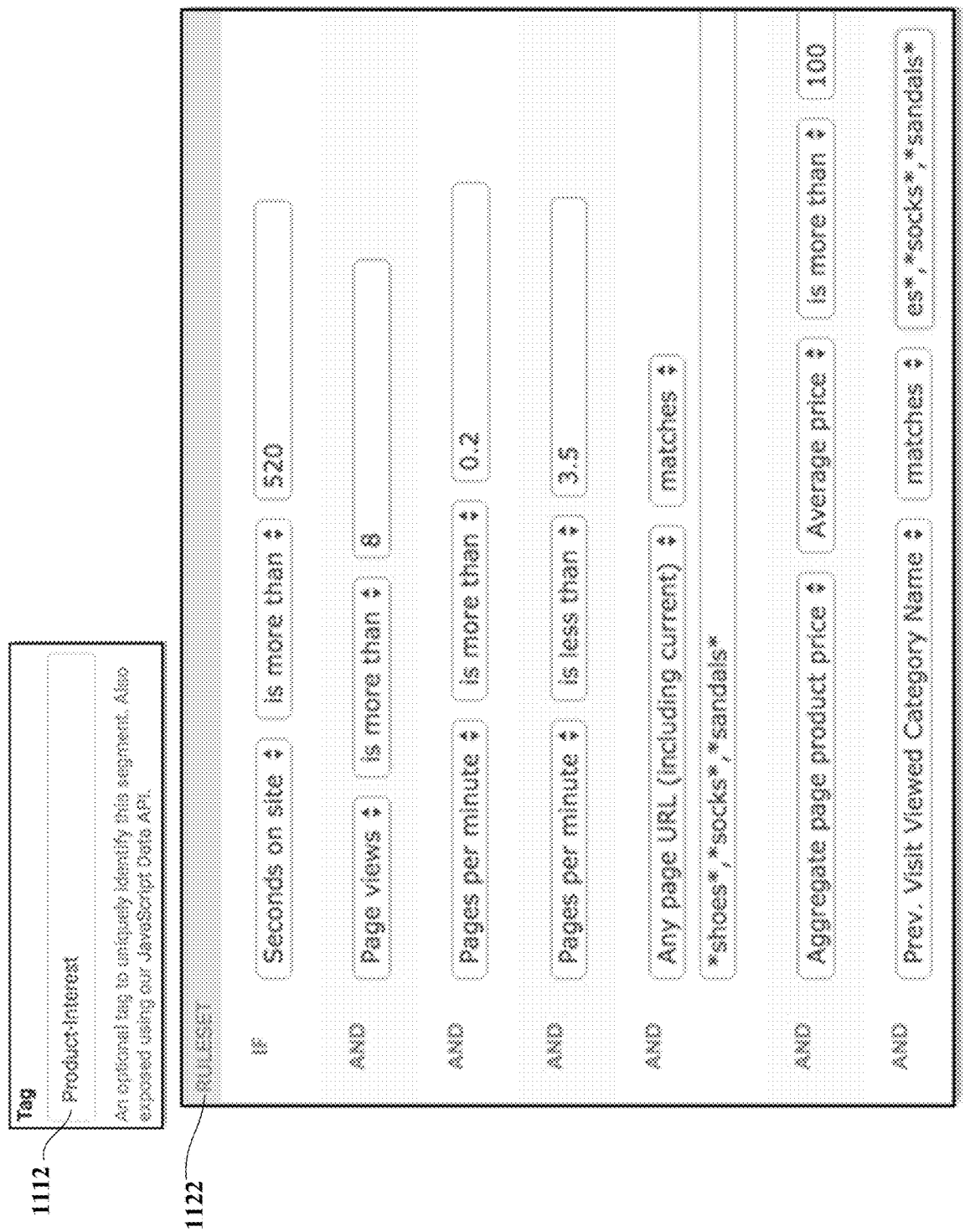
FIG. 11 shows an example product interest segment tag 1112 and ruleset 1122 for determining when to provide notification to a messaging agent.

In another use case, product interest can be tracked for visitors browsing a site, as they click on product and category pages, which reflect product interest and potential level of spending. The duration of the browsing time, the number of pages viewed per minute, the specific URLs visited during the current and prior session reveal a lot of information about the level of interest of individual visitors and can suggest messaging strategies that can incentivize a desired end result of the engagement. SegAAS makes possible notification of targetable segmentation strategies related to product interest to a messaging agent, supplying the real time context necessary to make the appropriate messaging decision. FIG. 11 shows an example product interest segment tag 1112 and ruleset 1122 for determining when to provide notification to a messaging agent with respect to a shopper with an interest in footwear. Instrumentation code listed next includes a Fanplayr script that when executed, listens for the rule segments into which the user falls, along with a callback function configured to run on the user's machine to perform the actions specified by an operator of the website. In this case, when ruleset 1122 is met for product interest segment tag 1112, the action is that a content area with a product suggestion appears on the user's web page.

```
<script>
  var fanplayr_api = [ ];
  fanplayr_api.push({
    "_type": "onPageView",
    "callback": function (event) {
      var product = event.product;
      if (product && event.segments.indexOf('Product-Interest')
        !== -1) {
        // The following code is a sample to fill a content area
        with a product suggestion
        var suggestedProduct = lookupProduct(product.sku);
        var html = "<div>";
        html += "Looks like you are interested in " +
        product.name + ". <br/>";
        html += "We think you might be interested in <br/> ";
        html += suggestedProduct.name + "<br/>";
        html += suggestedProduct.shortDesription + "<br/> ";
        html += "<img src='" +
        suggestedProduct.smallImageURL + "'/>";
        html += "</div>";
        $('#suggestionDiv').innerHTML(html);
      }
    }
  });
</script>
```

Another use case, for smarter re-targeting ads, involves informing an ad network of a visitor's prior engagement on a site, often by dropping a cookie which will be read by the ad network on other sites. Re-targeting applications can benefit by the use of SegAAS by achieving a greater level of understanding of the precise motivations that drove the previous visit by a visitor, thereby enabling the selection of a more relevant re-targeting ad.

In another use case, a Washington Post reader showing interest in a particular category of articles, such as technology articles, can be shown articles that reflect that interest, using segment category rules to match their interests.

For websites with higher average order values, such as fine furniture, appliances, and used cars, a valuable sale can hinge on a credit evaluation. The underlying analysis for credit assessment often relies on static third party data, location and prior history. Visitor engagement, current and previous, can be a valuable indicator as to whether or not the shopper indicates a concern about the affordability of an item. The indication of a concern can come in the form of a click to a credit options page or credit calculator, among other things. Combined with traditional indicators, engagement can be a good way of making credit affordable to shoppers who otherwise would be charged higher but less-intelligently informed rates.

In a use case for insurance sites, which often rely on static actuarial information to assess risk and offer quotes, engagement can be an additional tool that can drive more competitive and targeted rates.

Figure 12:
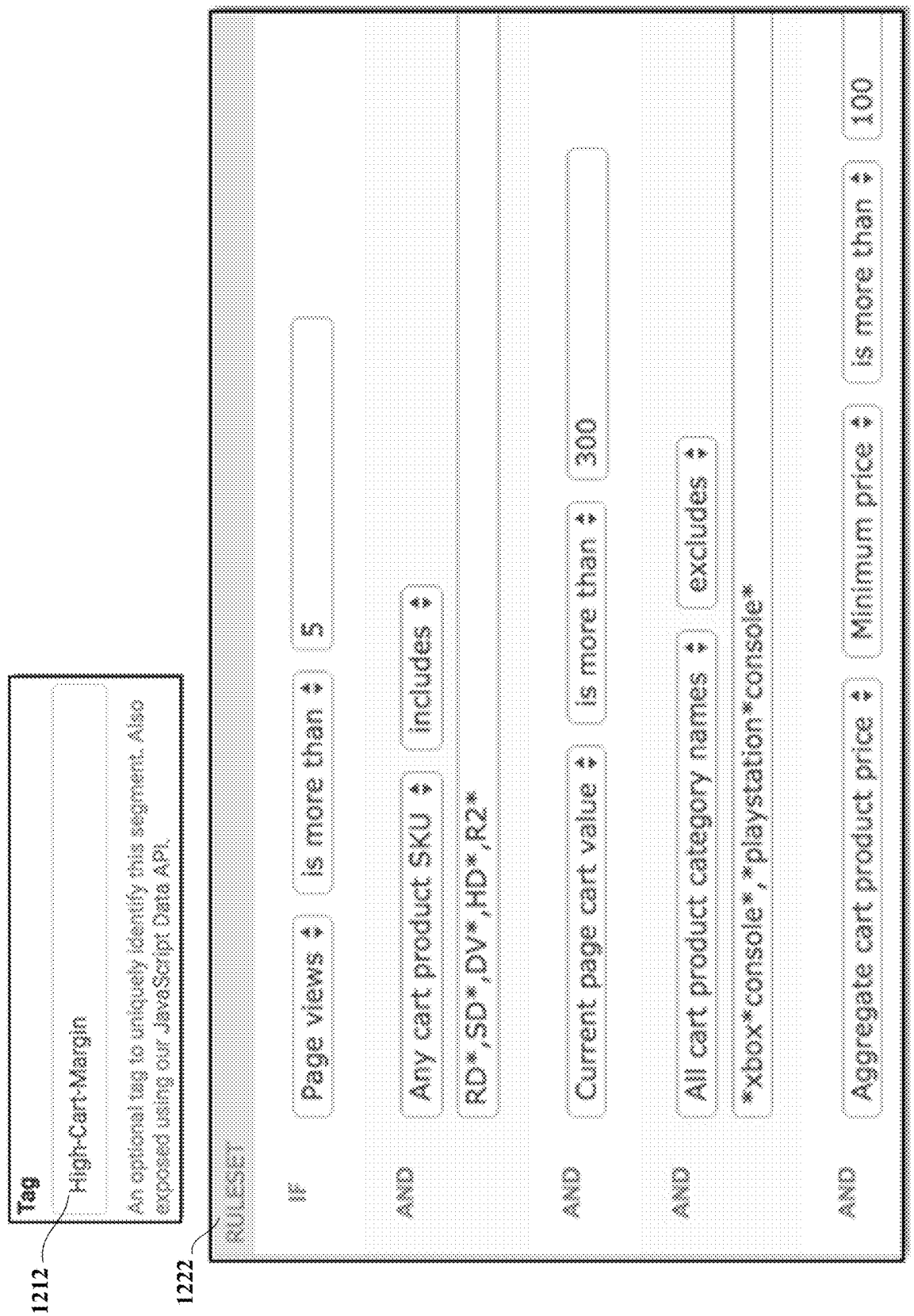
FIG. 12 shows example ruleset 1222 and high cart margin segment tag 1212 for notification to a messaging agent of an active shopper who is considering a purchase.

In yet another use case, the value of a potential transaction to a retailer is reflected in the details of shopping cart contents. Some products have a higher value and margin than others and therefore represent a much greater potential bottom-line contribution than others. SegAAS can notify messaging agents in real time of shoppers who have higher value carts and thus inform these agents of such visitor sessions so that they can take more assertive steps to ensure the completion of these transactions. FIG. 12 shows example ruleset 1222 and high cart margin segment tag 1212 for notification to a messaging agent of an active shopper who is considering a purchase of the items in a high margin, high value cart. The callback code in the example listed next shows a popup to a user who matches ruleset 1222 for high cart margin segment tag 1212.

```
<script>
  var fanplayr_api = [ ];
  fanplayr_api.push({
    "_type": "onPageView",
```

```
    "callback": function (event) {
        if (event.segments.indexOf('High-Cart-Margin') !== -1) {
            var cartData = event.segmentData['High-Cart-Margin'];
            if (cartData) {
                // The following code is a sample to show a popup to user
                var html = "<div>";
                html += "Hello, You have over $" + cartData.gross +
                " in cart";
                html += "Tell us what you are looking for and ";
                html += "we will get back to you!";
                html += "<form id='request-form' name='request-form'
                method='POST'
            action='/forms/submitRequest'>";
                html += "<span>Request</span>";
                html += "<textarea id='request'
                name='request'><textarea>";
                html += "<span>Email</span>";
                html += "<input type='text' id='email' name='email'/>";
                html += "<input type='submit' value='Send us your
                request'/>";
                html += "</div>";
                $('#popup').innerHTML(html);
                $('#popup').show( );
            }
        }
    }
});
```

In another use case, smarter email collections and opt-ins typically ask for email addresses, which are sent to email service providers who enforce various specialized services such as list assignment, spam filters and opt in and opt out enforcement. However, inadequate segmentation can result in frequent redundant email solicitation requests, especially from visitors who have previously submitted their email address. Segmentation as a Service™ can make email collection applications smarter by capturing and analyzing data relative to historical solicitations and improving decision making with regard to who does or does not receive an email request. Replacing an unwieldy existing email system can require custom build of an email collection interface and potentially tough negotiations within a company due to internal politics as to whether to build or buy a better email system. By using SegAAS and only showing the email widget based on segmentation rules, these rules can then be completely controlled by the customer web server. This makes it possible for marketing support personnel to try different things without having to go back to IT.

Figure 13:
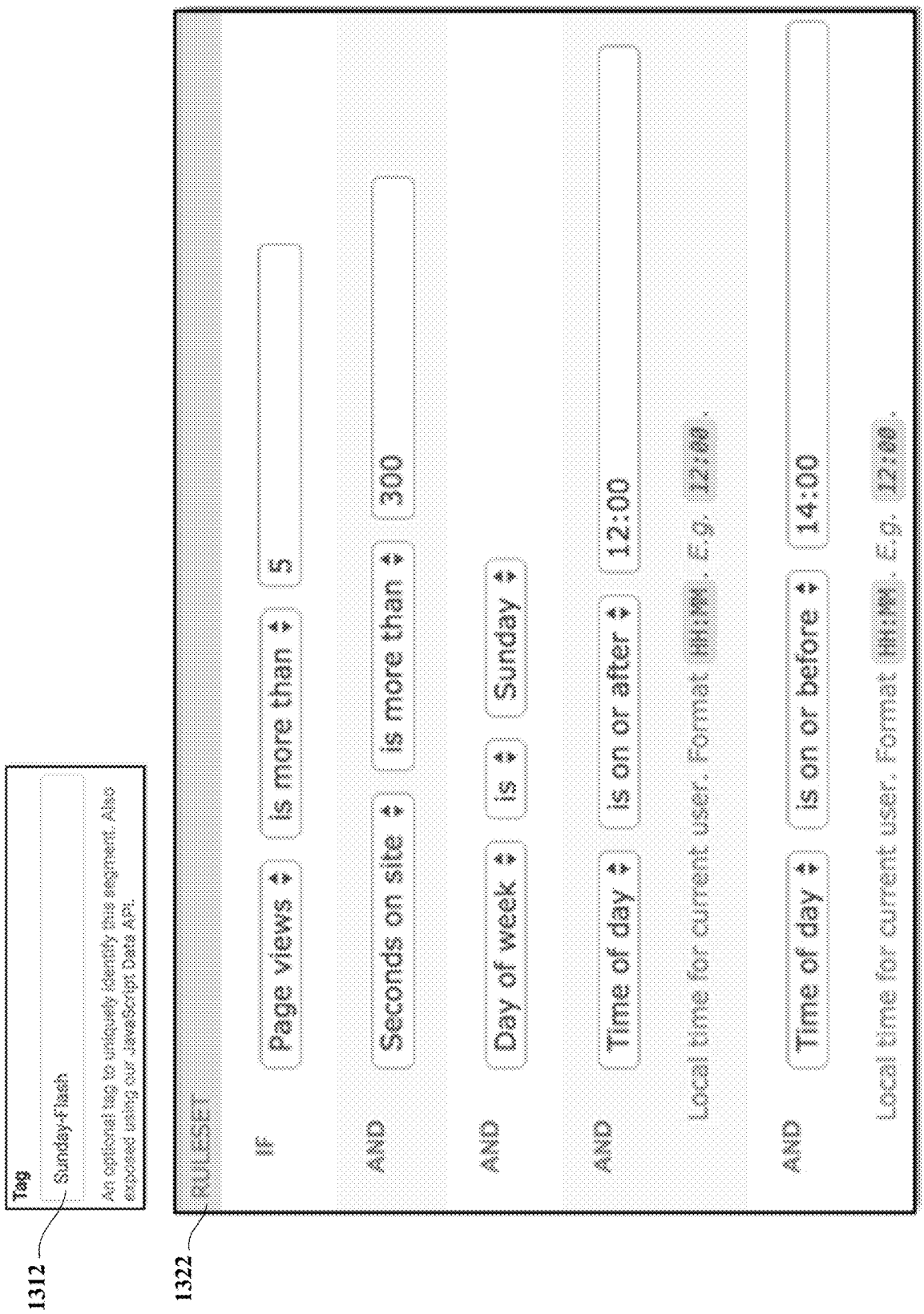
FIG. 13 shows example Sunday Flash segment tag 1312 and ruleset 1322 for notification to a flash sales messaging agent.

For yet another use case, SegAAS can make possible a timed promotion that offers the sudden appearance of an incentive for a given product or category of product while a visitor is shopping. The promotion can be a real-time response to browsing activity and appears as a short-lived, very personal opportunity to get a great deal. SegAAS can notify messaging agents in real-time of shoppers who have crossed a pageview-per-minute or time-on-site threshold or are browsing when a flash sale starts. FIG. 13 shows example Sunday Flash segment tag 1312 and ruleset 1322 for notification to a flash sales messaging agent. When a shopper accumulates more than five page views and is on the site for more than five minutes on a Sunday between noon and 2pm, the Sunday Flash segment is satisfied, so a short-lived, personalized opportunity can be triggered, and shown in a popup as shown in the callback function code listed next.

```
<script>
    var fanplayr_api = [ ];
```

```
    fanplayr_api.push({
        "_type": "onPageView",
        "callback": function (event) {
            var product = event.offer;
            if (offer && event.segments.indexOf('Sunday-Flash')
            !== -1) {
                // The following code is a sample to fill display an
                offer to the user
                var html = "<div>";
                html += "Congratulations! Use the code " +
                offer.code + " ";
                html += " to get " + offer.percent + "% off your
                order." <br/> ";
                html += "Hurry! Offer expires this session.<br/>";
                html += "</div>";
                $('#popup').innerHTML(html);
                $('#popup').show( );
            }
        }
    });
</script>
```

Three example scenarios that utilize the support of customer models and smarter product and content recommendations that continue to specialize, based on a variety of inputs, are described next. Recommended actions can be better informed by more precise segmentation based on current and previous engagement patterns. For example, using the administration screens or an API for specifying rulesets and desired actions, the websites can create a segment with rules that identify a cohort of users as being 'High Value Customers'. They could be users who have spent over $1,000 in the last six months, with a segment tagged as 'High Value Customers'. When a user visits the site and falls into this segment, the website code is notified by the service that the user has triggered the 'High Value Customers' segment, along with other segments they may have triggered. The code then presents a chat window provided by a third-party service, to a dedicated customer service agent who starts a personal dialog with the visitor, making them feel special and important. Over time, the website is successful and realizes that they need to switch to a different chat service to be able to scale. Using the disclosed technology, a simple change to the code on the website that handles presenting the chat window is all that is required. This can be done by the development resources, with no change required to the segmentation or without even involving the marketing resource. Similarly, if at some point the marketing resource decides they would like to target 'High Value Customers' as those who have spent $2,000 in six months, they simply change the rules in SegAAS and do not need to involve the development resource. In another example change, a completely new marketing strategy of the website decides to do away with 'High Value Customers' but would still like to open up a chat window to users who have visited the site a few times in the last week, but have not converted or purchased. They change the segmentation from being called 'High Value Customers' to 'Undecided Visitors'. This can be done easily within the administration portal by changing rules in SegAAS with no impact to the code on the website. The use of tags on segments helps when the desired scenario is different, but the tag is the same and continues to trigger opening of a chat window, and requires no development resources.

Figure 6:
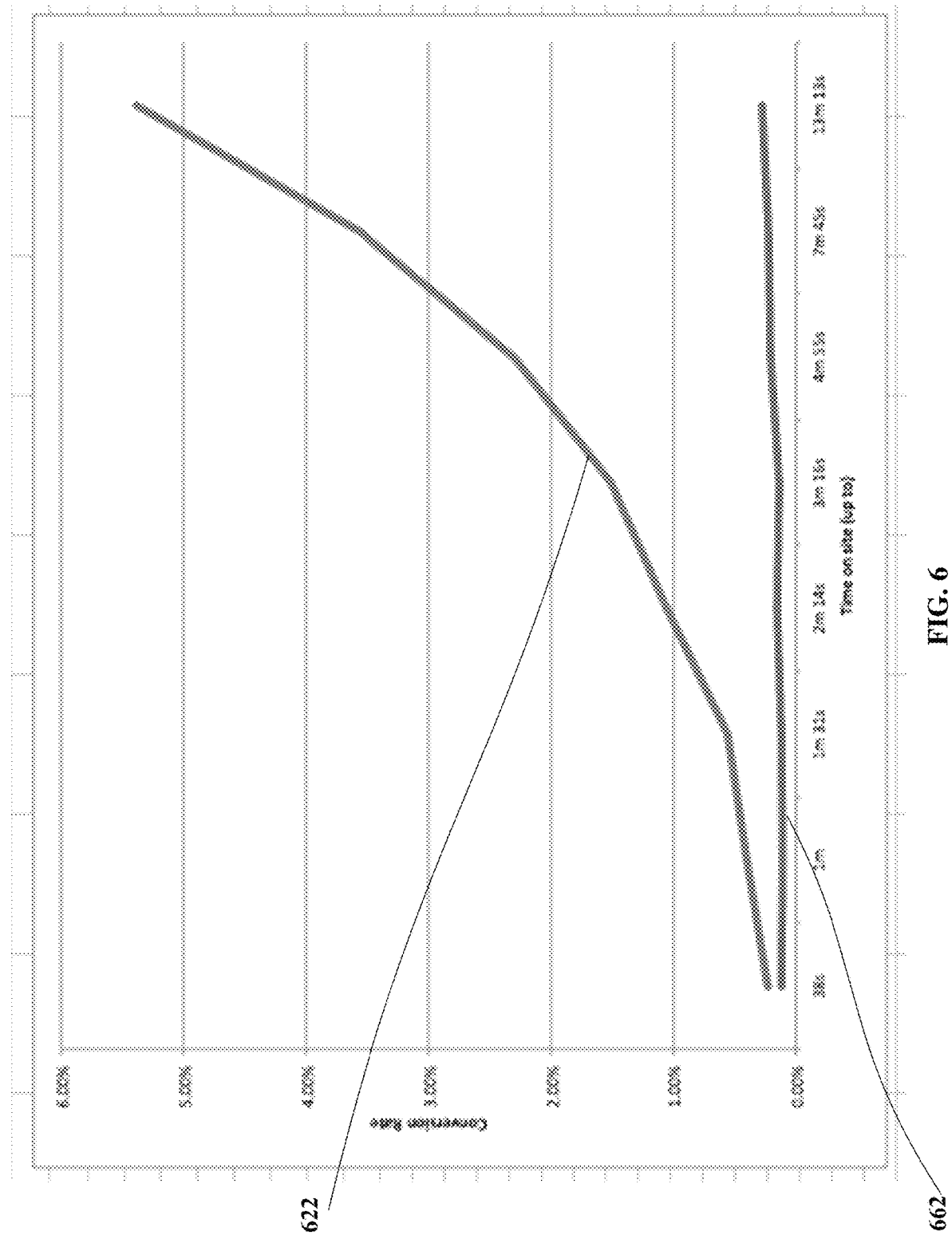
FIG. 6 shows an example set of curves that represent the relationship between the time on a website and the conversion rate in percent of the time on the site.

The time on site and conversion rate for a consumer of a website vary by site. For one implementation of the disclosed technology, FIG. 6 shows an example set of curves that represent the relationship between the time on the site on the x axis and the conversion rate in percent of the time on the site on the y axis. The curve 622 shows a typical conversion rate by cohort with time engaged, and the curve 662 shows the low likelihood of conversion for website users who stay on the website for extended periods of time. The longer the consumer of the website stays on the site, the more likely conversion is. To convert website users, the idea is to provide incentives to convert people who have not yet committed, waiting for an inflection point, in which the average is starting to diverge from the average consumer's behavior. Engagement needs to be long enough to be meaningful and to reveal enough behavior to use for prediction. Timing is critical: not too soon and not too late.

FIG. 7 shows an example conversion stage waterfall with various stages of the lifecycle of a visit and the drop-off between the stages. The percent of group shows the percentage of users in a stage compared to the previous stage. A lower number helps identify areas of focus for offering incentives to users to encourage them to move through the website pipeline. In some implementations, website operator server 108 with application server 128 delivers visitor websites for user interaction and receives data from the web, such as round robin AB testing alternates among offers to generate analytics at varying offer values.

Figure 8:
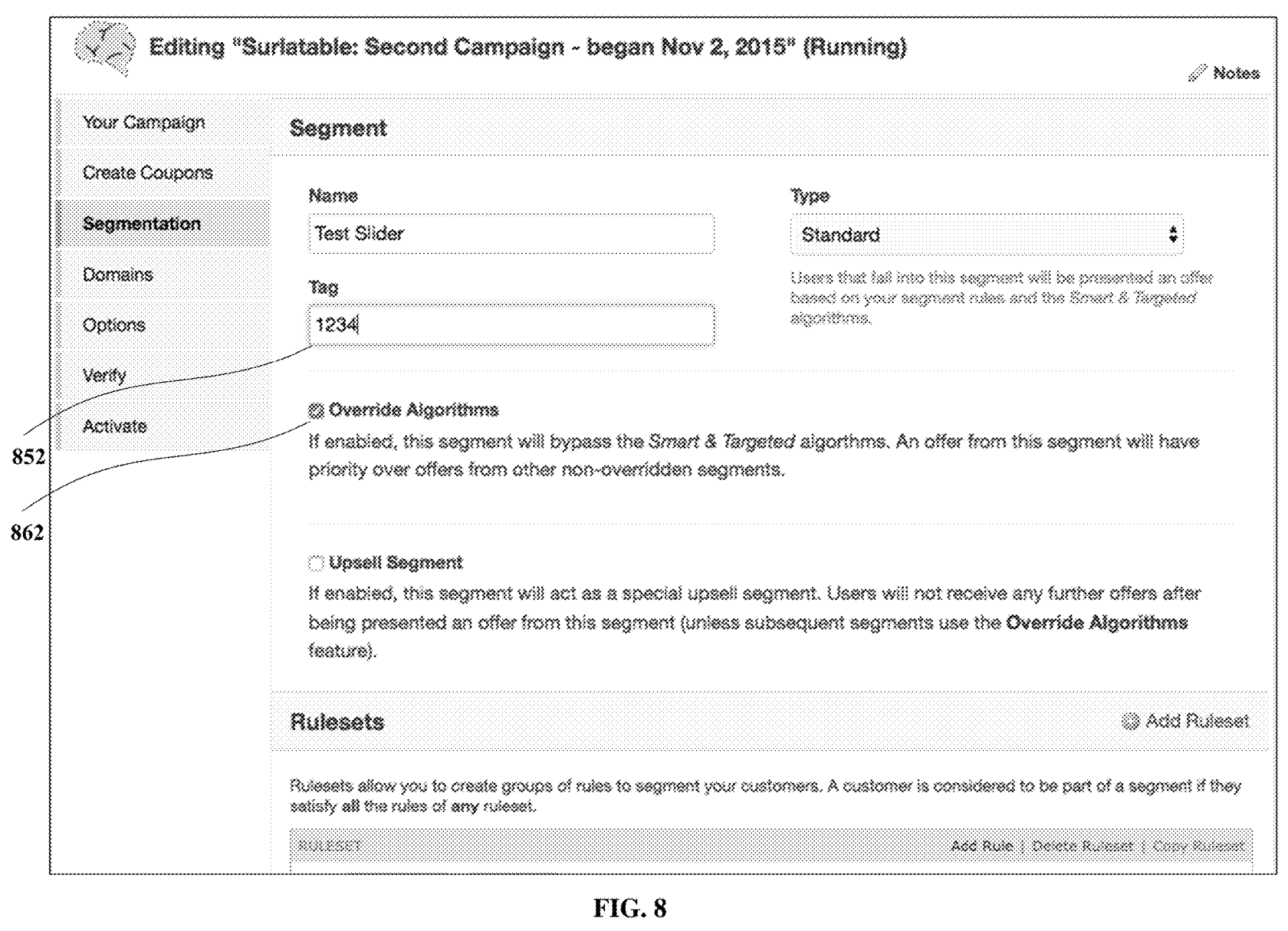

FIG. 8 shows an example segmentation tag 852 with value '1234' usable with callback functions to deliver particular segment-as-a-service offers, when the override algorithms checkbox 862 is activated. For some implementations, these algorithms provide services such as the Chatbot service, email management services and survey services described supra.

Computer System

Figure 9:
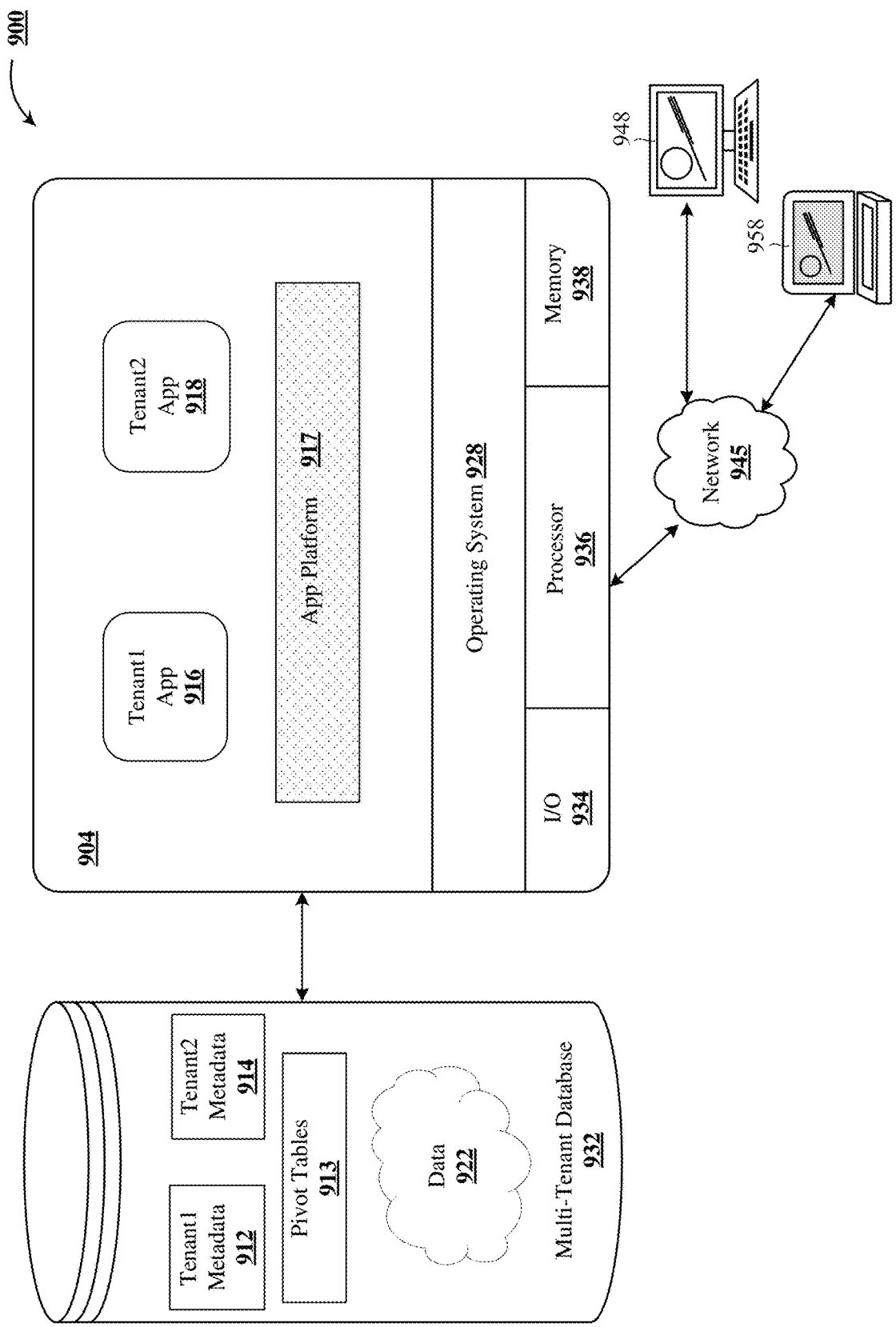
FIG. 9 is a block diagram of an example computer system for supplying Segmentation as a Service™.

FIG. 9 presents a block diagram of an exemplary system 900 suitable for implementing system 100 of FIG. 1 for supplying Segmentation as a Service™ (abbreviated SegAAS) from a SegAAS server, supplying instrumentation code to run on a user's machine and generate instrument readings that track a user session that visits a website and receiving at a SegAAS server a series of the instrument readings from the user session with the website, along with a callback API to which the SegAAS server needs to deliver results. In general, the illustrated system 900 of FIG. 9 includes a server 904 that dynamically supports virtual applications 916 and 918, based upon data 922 from a common database 932 that is shared between multiple tenants, alternatively referred to herein as a "multi-tenant database". Data and services generated by the virtual applications 916 and 918, including GUI clients, are provided via a network 945 to any number of client devices 948 or 958, as desired.

As used herein, a "tenant" or an "organization" refers to a group of one or more users that shares access to a common subset of the data within the multi-tenant database 932. In this regard, each tenant includes one or more users associated with, assigned to, or otherwise belonging to that respective tenant. Stated another way, each respective user within the system 900 is associated with, assigned to, or otherwise belongs to a particular tenant of the plurality of tenants supported by system 900. Tenants may represent users, user departments, work or legal organizations, and/or any other entities that maintain data for particular sets of users within system 900. Although multiple tenants may share access to the server 904 and the database 932, the particular data and services provided from the server 904 to each tenant can be securely isolated from those provided to other tenants. The multi-tenant architecture therefore allows different sets of users to share functionality and hardware resources without necessarily sharing any of the data 922 belonging to or otherwise associated with other tenants.

The multi-tenant database 932 is any sort of repository or other data storage system capable of storing and managing the data 922 associated with any number of tenants. The database 932 may be implemented using any type of conventional database server hardware. In various implementations, the database 932 shares processing hardware with the server 904. In other implementations, the database 932 is implemented using separate physical and/or virtual database server hardware that communicates with the server 904 to perform the various functions described herein. The multi-tenant database 932 may alternatively be referred to herein as an on-demand database, in that the multi-tenant database 932 provides (or is available to provide) data at run-time to on-demand virtual applications 916 or 918 generated by the application platform 917, with tenant1 metadata 912 and tenant2 metadata 914 securely isolated.

In practice, the data 922 may be organized and formatted in any manner to support the application platform 922. In various implementations, conventional data relationships are established using any number of pivot tables 913 that establish indexing, uniqueness, relationships between entities, and/or other aspects of conventional database organization as desired.

The server 904 is implemented using one or more actual and/or virtual computing systems that collectively provide the dynamic application platform 917 for generating the virtual applications. For example, the server 904 may be implemented using a cluster of actual and/or virtual servers operating in conjunction with each other, typically in association with conventional network communications, cluster management, load balancing and other features as appropriate. The server 904 operates with any sort of conventional processing hardware such as a processor 936, memory 938, input/output devices 934 and the like. The input/output devices 934 generally represent the interface(s) to networks (e.g., to the network 945, or any other local area, wide area or other network), mass storage, display devices, data entry devices and/or the like. User interface input devices 934 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include possible types of devices and ways to input information into application platform 917.

User interface output devices can include a display subsystem, a printer, a fax machine, or non-visual displays such as audio output devices. The display subsystem can include a light emitting diode (LED) screen, a flat-panel device such as a liquid crystal display (LCD), a cathode ray tube (CRT), a projection device, or some other mechanism for creating a visible image. The display subsystem can also provide a non-visual display such as audio output devices. In general, use of the term "output device" is intended to include all possible types of devices and ways to output information from processor 936 to the user or to another machine or computer system.

The processor 936 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 938 represents any non-transitory short or long term storage or other computer-readable media capable of storing programming instructions for execution on the processor 936, including any sort of random access memory (RAM), read only memory (ROM), flash memory, magnetic or optical mass storage, and/or the like. The computer-executable programming instructions, when read and executed by the server 904 and/or processor 936, cause the server 904 and/or processor 936 to create, generate, or otherwise facilitate the application platform 917 and/or virtual applications 916 and 918, and perform one or more additional tasks, operations, functions, and/or processes described herein. It should be noted that the memory 938 represents one suitable implementation of such computer-readable media, and alternatively or additionally, the server 904 could receive and cooperate with external computer-readable media that is realized as a portable or mobile component or application platform, e.g., a portable hard drive, a USB flash drive, an optical disc, or the like.

The application platform 917 is any sort of software application or other data processing engine that generates the virtual applications 916 and 918 that provide data and/or services to the client devices 948 and 958. In a typical implementation, the application platform 917 gains access to processing resources, communications interfaces and other features of the processing hardware using any sort of conventional or proprietary operating system 928. The virtual applications 916 and 918 are typically generated at run-time in response to input received from the client devices 948 and 958.

With continued reference to FIG. 9, the data and services provided by the server 904 can be retrieved using any sort of personal computer, mobile telephone, tablet or other network-enabled client device 948 or 958 on the network 945. In an exemplary implementation, the client device 948 or 958 includes a display device, such as a monitor, screen, or another conventional electronic display capable of graphically presenting data and/or information retrieved from the multi-tenant database 932.

In some implementations, network(s) 945 can be any one or any combination of Local Area Network (LAN), Wide Area Network (WAN), WiMAX, Wi-Fi, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks, including the Internet.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation.

Moreover, the technology disclosed can be implemented using two or more separate and distinct computer-implemented systems that cooperate and communicate with one another. The technology disclosed can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Some Particular Implementations

We describe various implementations of supplying Segmentation as a Service™ (abbreviated SegAAS) from a SegAAS server.

One disclosed implementation includes a method of supplying Segmentation as a Service™ (abbreviated SegAAS) from a SegAAS server, supplying instrumentation code to run on a user's machine and generate instrument readings that track a user session that visits a website. The disclosed method also includes receiving at a SegAAS server a series of the instrument readings from the user session with the website, along with a callback API to which the SegAAS server needs to deliver results and analyzing the instrument readings to track progress of the user session. From the analyzing, the disclosed method further includes generating a list of segment codes that characterize results of the analysis according to parameters or rules specified by an operator of the website being visited in the user session. The disclosed method additionally includes repeatedly calling back the code running on the user's machine via the callback API and delivering the list of segment codes and updates to the list of segment codes based on the analyzing of the progress, whereby the operator of the website can time the delivery of unsolicited content directed to retaining the visitor and extending the user session with the website.

This method and other implementations of the technology disclosed can include one or more of the following features and/or features described in connection with additional methods disclosed. In the interest of conciseness, the combinations of features disclosed in this application are not individually enumerated and are not repeated with each base set of features.

One disclosed method further includes the SegAAS server using received data to look up historical information regarding a user who is conducting the user session and combining the historical information regarding the user with the analyzing the instruments readings to track progress of the user session when generating the list of segment codes.

Some implementations of the disclosed method further include the SegAAS server providing a graphical user interface for creation of parameters or rules by the operator of the website that cause generation of the segment codes. These implementations also include receiving from the operator, through the graphical user interface, instructions for creating the parameters or rules and persisting the parameters or rules for use when analyzing the instrument readings to track progress of the user session and generating the list of segment codes. Some implementations of the disclosed technology further include creation of the parameters or rules incorporating historical information about the user who is conducting the user session.

For some implementations of the disclosed method, the SegAAS server is hosted on an Internet using a server distinct from a server that runs the website. Some implementations further include the SegAAS server using a chatbot service, and email message service, a survey service or other third party application as an element of the unsolicited content directed to retaining the user and extending the user session with the website.

One disclosed implementation of a method of supplying SegAAS from a SegAAS server includes causing delivery of instrumentation code configured to run on a user's machine and generate instrument readings that track a user session during a visit to a website. The disclosed method also includes callback function code included in the instrumentation code, configured to run on the user's machine, further configured to perform actions specified by an operator of the website, as triggered by delivery of a list of segment codes. The disclosed method further includes receiving at a SegAAS server a series of the instrument readings from the user session with the website and analyzing the instrument readings received at the server to track progress of the user session. The method also includes, from the analyzing, generating a list of segment codes that characterize results of the analyzing according to parameters or rules specified by an operator of the website being visited in the user session and repeatedly causing delivery of updated lists of the segment codes based on the analyzing of the progress. Further, the operator of the website can time performance of unsolicited actions directed to retaining the user and extending the user session with the website by triggering the callback function code. Instrumentation code is also referred to as customer action data. In one implementation, the instrumentation code uses JavaScript. In another implementation, a different software language can be utilized.

As used in this context website refers to browsers on desktop machines and mobile devices as well as mobile apps on iOS and Android platforms. One of reasonable skill in the art will understand that code can be repurposed between browser pages and web apps by following developer guidelines for html and JavaScript for the specific platforms.

Some implementations of the disclosed method further include the SegAAS server using received data to look up historical information regarding a user who is conducting the user session and combining the historical information regarding the user with the analyzing the instrument readings to track progress of the user session when generating the list of segment codes.

One implementation of the disclosed method further includes the SegAAS server providing a graphical user interface for creation of parameters or rules by the operator of the website that cause generation of the segment codes, receiving from the operator, through the graphical user interface, instructions for creating the parameters or rules, and persisting the parameters or rules for use when analyzing the instrument readings to track progress of the user session and generating the list of segment codes.

Some implementations of the disclosed method further include callback function code configured to invoke a chatbot service whereby an informed, automated response to visitor inquiries is provided, based on the updated lists of the segment codes.

One implementation of a disclosed method of supplying Segmentation as a Service™ from a SegAAS server, includes causing delivery of instrumentation code and segment code processing code configured to run on a user's machine and generate instrument readings that track a user session during a visit to a website and receive and process segment codes during the visit by invoking callback function code, configured to run on the user's machine, that perform actions specified by an operator of the website, as triggered by delivery of a list of the segment codes. The disclosed method also includes receiving at a SegAAS server a series of the instrument readings from the user session with the website and analyzing the instrument readings received at the server to track progress of the user session. The method further includes, from the analyzing, generating a list of segment codes that characterize results of the analyzing according to parameters or rules specified by an operator of the website being visited in the user session. The method also includes repeatedly causing delivery of updated lists of the segment codes based on the analyzing of the progress, and the operator of the website can time performance of unsolicited actions directed to retaining the user and extending the user session with the website.

In some implementations, the server causes delivery of the callback function code with the instrumentation code. In other implementations, the operator of the website makes the callback function code available to the segment code processing code.

One implementation of the disclosed method further includes the callback function code configured to invoke a popup with a personalized message that is offered for a constrained period of time, as an element of unsolicited actions directed to retaining the user and extending the user session with the website.

Another implementation of the disclosed method includes the callback function code configured to invoke a popup and using an email management service as an element of unsolicited actions directed to retaining the user and extending the user session with the website.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One disclosed implementation may include a tangible non-volatile computer readable storage media loaded with computer program instructions that, when executed on a server, cause a computer to implement any of the methods described earlier.

Another disclosed implementation may include a server system including one or more processors and memory coupled to the processors, the memory loaded with instructions that, when executed on the processors, cause the server system to perform any of the methods described earlier.

This system implementation and other systems disclosed optionally can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim as follows:

1. A method of supplying Segmentation as a Service™ (abbreviated SegAAS), in a system including a web server, a user client machine, and an SegAAS server, each operated by a distinct operator, the method including:
   responsive to a request from software running on the user client machine, either the web server or the SegAAS server sending instrumentation code that is configured to run on the user client machine and generate instrument readings that track a user session during a visit to a website and sending listener code that is configured to run on the user client machine and cause conditional triggering of actions specified by an operator of the website through a callback, the conditional triggering responsive to codes in a list of segment codes;
   receiving at the SegAAS server the instrument readings and analyzing the instrument readings to track progress and time on the website during the visit;
   the SegAAS server generating and updating a plurality of the segment code lists that identify user segments according to parameters or rules specified by the operator of the website that take into account the time visiting the website, and repeatedly pushing to the user client machine the updated lists of the segment codes;
   whereby the listener code processes each updated list, and causes conditional triggering of a recommendation service through a callback that provides product and/or content recommendations that corresponds to at least one segment code in one of the updated lists at a time directed to extending the visit to the website or converting the visit to a purchase.

2. The method of claim 1, further including the SegAAS server:
   using received data to determine a margin on contents of a shopping cart and using the margin to add a user segment code to the updated lists.

3. The method of claim 1, further including the SegAAS server:
   using received data to determine a value of contents of a shopping cart and using the value to add a user segment code to the updated lists.

4. The method of claim 1, further including the SegAAS server:
   using received data to look up historical information regarding a user who is conducting the user session; and
   using the historical information when the analyzing the instrument readings to generate and update the list of segment codes.

5. The method of claim 1, further including the SegAAS server:
   providing a graphical user interface for creation of the parameters or rules;
   receiving from the operator, through the graphical user interface, instructions for creating the parameters or rules; and
   persisting the parameters or rules for use when analyzing the instrument readings.

6. The method of claim 1, further including receiving from the operator of the website a time threshold in the parameters or rules to control performance of an unsolicited action after the time directed by the time threshold.

7. The method of claim 1, further including:
   the user client machine running a SegAAS library;
   wherein the SegAAS library receives the pushed updated lists of the segment codes and passes the updated lists to the listener code.

8. The method of claim 1, further including the listener code configured to conditionally trigger a chatbot service through a callback and provide an informed, automated response to the user client machine.

9. The method of claim 1, further including the listener code configured to conditionally trigger a popup through a callback and use an email management service during the user session with the website.

10. The method of claim 1, further including the listener code configured to conditionally trigger a popup with a personalized message through a callback that is offered for a constrained period of time during the user session with the website.

11. A non-transitory computer readable storage media loaded with instructions that, when executed on at least one server, cause the server system to perform a method including:
    responsive to a request from software running on a user client machine, either a web server or a SegAAS server sending instrumentation code that is configured to run on the user client machine and generate instrument readings that track a user session during a visit to a website and sending listener code that is configured to run on the user client machine and cause conditional triggering of actions specified in the listener code by an operator of the website, the conditional triggering responsive to codes in a list of segment codes;
    receiving at the SegAAS server the instrument readings and analyzing the instrument readings to track progress and time on the website during the visit;
    the SegAAS server generating and updating a plurality of the segment code lists that identify user segments according to parameters or rules specified by the operator of the website that take into account the time visiting the website, through a callback, and repeatedly pushing to the user client machine the updated lists of the segment codes;
    whereby the listener code processes each updated list, and causes conditional triggering of a recommendation service through a callback that provides product and/or content recommendation that corresponds to at least one segment code in one of the updated lists at a time directed to extending the visit to the website or converting the visit to a purchase.

12. The non-transitory computer readable storage media of claim 11, loaded with instructions that, when executed on at least one server, cause the server system to perform a method further including the SegAAS server using received data to determine a margin on contents of a shopping cart and using the margin to add a user segment code to the updated lists.

13. The non-transitory computer readable storage media of claim 11, loaded with instructions that, when executed on at least one server, cause the server system to perform a method further including the SegAAS server using received data to determine a value of contents of a shopping cart and using the value to add a user segment code to the updated lists.

14. The non-transitory computer readable storage media of claim 11, loaded with instructions that, when executed on at least one server, cause the server system to perform a method further including the SegAAS server:
using received data to look up historical information regarding a user who is conducting the user session; and
using the historical information when the analyzing the instrument readings to generate and update the list of segment codes.

15. The non-transitory computer readable storage media of claim 11, loaded with instructions that, when executed on at least one server, cause the server system to perform a method further including the SegAAS server:
providing a graphical user interface for creation of the parameters or rules;
receiving from the operator, through the graphical user interface, instructions for creating the parameters or rules; and
persisting the parameters or rules for use when analyzing the instrument readings.

16. The non-transitory computer readable storage media of claim 11, wherein the listener code is further configured to conditionally trigger a chatbot service and provide an informed, automated response to the user client machine.

17. The non-transitory computer readable storage media of claim 11, wherein the listener code configured to conditionally trigger a popup and use an email management service during the user session with the website.

18. A system including a user client machine and a Segmentation as a Service™ (abbreviated SegAAS) server, in communication with a web server, each operated by a distinct operator, the system configurable to carry out a method including:
the user client machine making a request to a website and receiving from either the web server or the SegAAS server:
instrumentation code that is configured to generate instrument readings that track a user session during a visit to a website; and
listener code that is configured to cause conditional triggering of actions specified in the listener code by an operator of the website, through a callback, the conditional triggering responsive to codes in a list of segment codes;
the SegAAS server:
receiving the instrument readings from the user session during the visit;
analyzing the instrument readings to track progress and time on the website during the visit;
generating and updating a plurality of the segment code lists that identify user segments according to parameters or rules specified by the operator of the website that take into account the time visiting the website; and
repeatedly pushing to the user client machine the updated lists of the segment codes; and
the listener code processing each updated list and causing conditional triggering of a recommendation service through a callback that provides product and/or content recommendation that corresponds to at least one segment code in one of the updated lists, at a time directed to extending the visit to the website or converting the visit to a purchase.

19. The system of claim 18, further configurable to perform a method including the SegAAS server using received data to determine a margin on contents of a shopping cart and using the margin to add a user segment code to the updated lists.

20. The system of claim 18, further configurable to perform a method including the SegAAS server using received data to determine a value of contents of a shopping cart and using the value to add a user segment code to the updated lists.

21. The system of claim 18 further configurable to perform a method including the SegAAS server:
using received data to look up historical information regarding a user who is conducting the user session; and
using the historical information when analyzing the instrument readings to generate and update the list of segment codes.

22. The system of claim 18, further configurable to perform a method including the SegAAS server:
providing a graphical user interface for creation of the parameters or rules;
receiving from the operator, through the graphical user interface, instructions for creating the parameters or rules; and
persisting the parameters or rules for use when analyzing the instrument readings.

23. The system of claim 18, wherein the listener code is further configurable to conditionally trigger a chatbot service and provide an informed, automated response to the user client machine.

24. The system of claim 18, wherein the listener code is further configurable to conditionally trigger a popup and use an email management service during the user session with the website.

* * * * *